March 10, 1936.  E. F. BONSER  2,033,224
CLUTCH OPERATING MECHANISM FOR PRESSES
Filed March 13, 1931
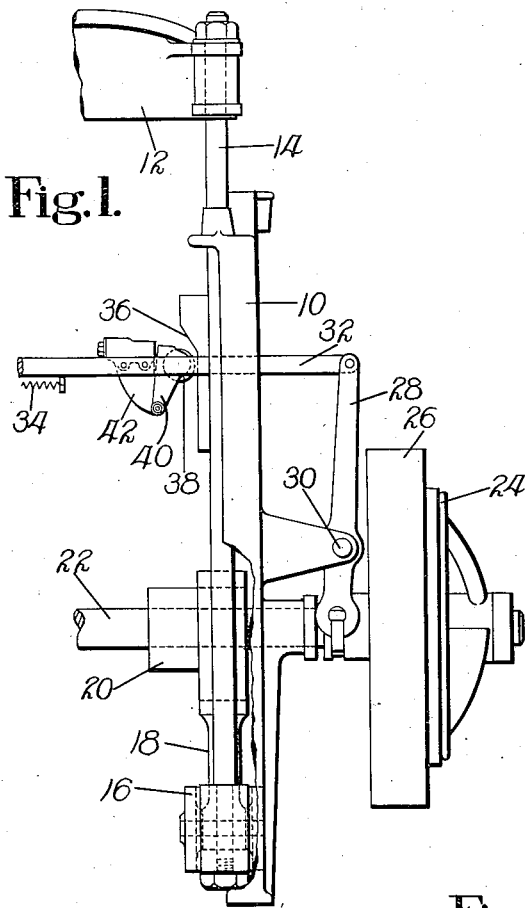
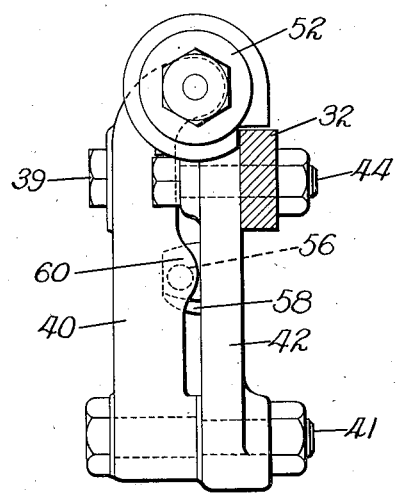
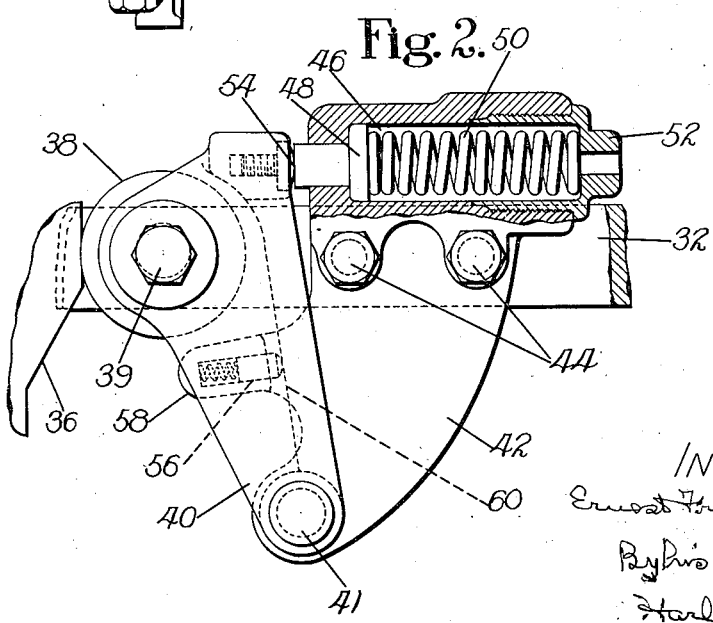
INVENTOR-
Ernest Frederick Bonser
By his Attorney,
Harlow M. Davis Patented Mar. 10, 1936

2,033,224

UNITED STATES PATENT OFFICE 2,033,224

CLUTCH OPERATING MECHANISM FOR PRESSES

Ernest Fredrick Bonser, Leicester, England, assignor to United Shoe Machinery Corporation, Paterson, N. J., a corporation of New Jersey Application March 13, 1931, Serial No. 522,246
In Great Britain March 27, 1930

6 Claims. (Cl. 192—82)

This invention relates to presses and is herein illustrated as embodied in a press of the type used for dieing-out shoe-part blanks from sheet material.

Presses of the type referred to, heretofore in use commercially, commonly comprise a presser member arranged for reciprocation toward and away from a cutting block by means of a rotary shaft which is operatively connected to a power pulley by means of a clutch. The clutch is usually operated by a lever and a connecting link which bears a roll in position to be engaged by a cam associated with the presser member, whereby engagement of the clutch parts is insured during pressure-applying operation of the presser member. In presses of the construction indicated it is necessary to set the roll accurately relatively to the connecting link for the reason that if the roll is located at one side of its proper position the cam will not be operative to exert sufficient force to hold the clutch parts together, and if the roll is located at the other side of its proper position the cam may apply such force to the clutch-operating parts as to cause their breakage.

It is an object of the present invention to provide an improved press of the type referred to which, without sacrificing any of the advantages of presses as heretofore constructed, will have its parts so constructed and arranged that under normal operating conditions the clutch will be operatively connected to the shaft during the pressure-applying operation but will eliminate all danger of breakage of the clutch-operating parts even under the roughest treatment to which they will ever be subjected. In view of the foregoing and as illustrated, the invention provides a press in which operation of the clutch during pressure-applying operations is insured by a member movable with the presser member and herein illustrated as a cam which engages clutch-operating means adapted to yield when the forces exerted by the cam are excessive. Preferably, the clutch-operating means comprises a link which carries a roll for engaging the cam, the link having a spring-pressed plunger operative under force exerted by the cam upon the roll to cause engagement of the clutch parts but yieldable under such forces exerted by the cam as might otherwise be sufficient to break the clutch-operating means. The spring transmits the force exerted by the cam to maintain the clutch parts in engagement during a normal pressure-applying operation of the presser member. The construction above outlined provides a comparatively simple device for accomplishing the desired result and at the same time it is effective to insure against breakage of parts. Furthermore, the yielding mounting of the roll makes it unnecessary to set the roll relatively to the clutch-operating member with any great degree of accuracy.

Other objects and features of the invention will be apparent from the accompanying drawing when taken in connection with the following detailed specification and will be set forth in the claims.

In the drawing,

Fig. 1 is a front elevation of portions of a press, illustrating one embodiment of the invention;

Fig. 2 is a side view, partly in section, of the cam and yieldable roll for operating the clutch; and Fig. 3 is an end view of the mounting for the roll.

The machine as illustrated in Fig. 1 of the drawing has a frame 10 and a presser member 12 mounted for reciprocation relatively to the frame upon rods one of which is indicated by reference character 14. The rods at each end of the machine are slidably mounted in the frame 10 and at their lower ends are secured to a crosshead 16 operatively connected to an eccentric 20 on a drive shaft 22 by means of a connecting rod 18. Fixedly secured on one end of the shaft 22 is a cone-clutch member 24 arranged to be engaged by a power pulley 26 which with the member 24 constitutes a clutch. The pulley 26 is loosely mounted upon the shaft 22 and is movable axially thereof into engagement with the clutch member 24 by a lever 28 fulcrumed at 30 on the frame 10. The lever 28 is operated by a link 32 upon action of a spring 34 under manual control of the operator. Movement of the link 32 to the left in Fig. 1 causes engagement of the pulley 26 with the clutch member 24 with the result that the shaft 22 is turned to produce a reciprocation of the presser member 12. To insure engagement of the clutch parts when the presser member 12 approaches the lower end of its stroke, at which time the member 12 applies pressure to work which may be carried upon a cutting block (not shown), there is provided a cam 36 carried by rod 14 and adapted to engage a roll 38 carried by the link 32 to exert additional force operating upon the lever 28 to hold together the pulley 26 and the clutch member 24, thereby to prevent slipping of the clutch parts during the pressure-applying operation. For a more detailed description of the construction and operation of the parts thus far described, reference may be had to United States Letters Patent No. 1,194,379, granted August 15, 1916 upon an application filed in the names of Gouldbourn and Bates.

In order to insure against breakage of clutch-operating parts, particularly members 28 and 32, there is provided a yieldable connection between the link 32 and the cam 36. To this end, Fig. 2, the roll 38 is mounted upon a stud 39 on an arm 40 which is carried by a pivot 41 mounted in a bracket 42 which, in turn, is secured to the link 32 by bolts 44. The bracket 42 is provided with a recess 46 within which is mounted a plunger 48 which extends through the forward wall of the recess and which is normally urged outwardly by a stiff spring 50 mounted in the recess. One end of the spring 50 engages the rearward part of the plunger and the other end bears against a plug 52 screwed into the recess. Tension of the spring can readily be adjusted by varying the position of the plug. The forward end of the plunger 48 is arranged to make contact with a hardened button 54 carried by the arm 40 and is operative normally to force the arm and the roll 38 carried by it outwardly or away from the bracket 42. The button 54 and plunger 48 are held in engagement by a spring-pressed plunger 56 mounted in a lug 58 on the bracket 42 and arranged to engage a flange 60 on the arm 40. The arm 40 under the force exerted by cam 36 upon the roll 38 is operative, through the plunger 48 and spring 50, to effect movement of the link 32 to the left in Fig. 1, thus to operate the lever 28 to maintain the pulley and clutch member in close engagement with each other during the time that the cam 36 is operative. The bracket 42 is so located upon the link 32 that the roll will always be in position to be engaged by the cam 38 upon descent of the presser member. Because of this fact and the fact that the roll is pivotally mounted, any necessity for careful adjustment of the roll along the link is eliminated. The spring 50 permits yield of the arm 40 and the roll 38 along the link, the tension of the spring being such as to permit yield of the parts before the force exerted by the cam 36 can become great enough to break the link 32 or the lever 28. On the other hand, the spring 50 is adjusted so that it exerts sufficient pressure in forcing the plunger 48 and roll 38 outwardly so that the cam 36 upon engaging the roll will, through the link 32, force the clutch parts together with sufficient pressure to prevent slipping of the clutch under normal loads for which the machine is designed to withstand. This construction thus operates to prevent stalling of the machine with the presser member near the bottom of its reciprocating stroke in normal operation upon heavy material, and at the same time provides means which eliminate any possibility of breakage of parts resulting from inaccurate setting of the roll.

In the operation of the machine, the spring 34, under the control of the operator, moves the link 32 in a direction to cause engagement of the clutch with the result that the shaft 22 causes a reciprocation of the presser member 12. As the presser member descends, the cam 36 engages the roll 38, causing the rock arm 40 to force the plunger 48 inwardly against the compression of the spring 50 with the result that the link 32 is forced in the direction to operate the lever 28 to apply additional pressure upon the clutch parts to hold them together while the presser member is near the bottom of its reciprocation, during which time the member applies pressure to the work being operated upon. The spring 50 provides sufficient yield under forces exerted by the cam 36 to prevent the production of such stresses in the clutch operating parts as might break them.

Having described my invention, what I claim as new and desire to secure by Letters Patent of the United States is:—

1. In a press having a presser member, means for reciprocating the presser member including a clutch, a member for controlling the clutch, and means associated with the presser member for operating the clutch-controlling member to insure operation of the clutch during a portion of each reciprocation of the presser member, a spring carried by the clutch-controlling member, and means mounted upon said clutch-controlling member for engaging the spring to operate the controlling member in response to operation of said means associated with the presser member.

2. In a press having a frame, a presser member mounted for reciprocating movement relatively to the frame, a drive shaft, a pulley loosely mounted on the shaft, a clutch member secured to the shaft, a lever for causing engagement of the pulley with the clutch member for operatively connecting the presser member and shaft, a link for operating the lever, and a cam mounted for movement with the presser member, a spring-pressed plunger for transmitting force exerted by the cam to the link.

3. In a press having a presser member, a shaft for driving the member, a clutch for operatively connecting the presser member to the shaft, and means for effecting operation of the clutch comprising a link, a roll carried by the link, and a cam mounted for movement with the presser member for engaging the roll to force the link in a direction to cause clutch engagement, and a yieldable connection between the roll and link for transmitting force exerted by the cam to the link.

4. In a press for operating upon sheet material, having a presser member, means for reciprocating the presser member including a clutch, a cam mounted for movement with the presser member, a clutch-operating member, and a roll mounted on the clutch-operating member for engaging the cam, a spring-pressed plunger carried by the clutch-operating member for forcing the roll toward the cam but yieldable under such forces exerted by the cam as otherwise would be great enough to break operating parts of the machine.

5. In a press having a presser member, a shaft for producing reciprocations of the presser member, a clutch for operatively connecting the shaft and presser member, and means for operating the clutch including a cam mounted for movement with the presser member, and a link operatively connected to the clutch, a bracket carried by the link and having therein a spring-pressed plunger, an arm pivotally mounted on the bracket and arranged to be engaged by the plunger, and a roll carried by the arm for engaging the cam upon descent of the presser member to insure operation of the clutch.

6. In a press having a presser member, a drive shaft, a clutch for operatively connecting the presser member and drive shaft, a link for actuating the clutch, and means associated with the presser member to force the link in a direction to insure operation of the clutch, a bracket carried by the link, a spring-pressed plunger carried by the bracket, an arm pivotally mounted on the bracket and having means for forcing the arm into engagement with the spring-pressed plunger, a roll carried by the arm for engaging said means associated with the presser member.

ERNEST FREDRICK BONSER.